United States Patent
Shiota et al.

(10) Patent No.: US 9,724,769 B2
(45) Date of Patent: Aug. 8, 2017

(54) CUTTING INSERT AND INDEXABLE ROTARY CUTTING TOOL

(71) Applicant: TUNGALOY CORPORATION, Iwaki-shi, Fukushima (JP)

(72) Inventors: Yusuke Shiota, Iwaki (JP); Takahiro Aso, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 214 days.

(21) Appl. No.: 14/421,357

(22) PCT Filed: Aug. 30, 2013

(86) PCT No.: PCT/JP2013/073422
§ 371 (c)(1),
(2) Date: Feb. 12, 2015

(87) PCT Pub. No.: WO2014/050438
PCT Pub. Date: Apr. 3, 2014

(65) Prior Publication Data
US 2015/0202697 A1    Jul. 23, 2015

(30) Foreign Application Priority Data

Sep. 27, 2012  (JP) ................................. 2012-213413

(51) Int. Cl.
*B23C 5/20*    (2006.01)
*B23C 5/10*    (2006.01)

(52) U.S. Cl.
CPC .............. *B23C 5/207* (2013.01); *B23C 5/109* (2013.01); *B23C 2200/0411* (2013.01);
(Continued)

(58) Field of Classification Search
CPC ..... B23C 5/207; B23C 5/109; B23C 2200/28; B23C 2200/283; B23C 2200/0411;
(Continued)

(56) References Cited

U.S. PATENT DOCUMENTS 5,853,267 A * 12/1998 Satran ..................... B23C 5/202
                                                                 407/113
7,040,844 B1    5/2006 Daiguji
(Continued)

FOREIGN PATENT DOCUMENTS

| JP | 2006-205298 | 8/2006 |
| JP | 2008-213078 | 9/2008 |
| JP | 2008-254129 | 10/2008 |

OTHER PUBLICATIONS

Internatinal Preliminary Report on Patentability issued in PCT counterpart application (No. PCT/JP2013/073422) issued Mar. 31, 2015.

(Continued)

*Primary Examiner* — Sunil K Singh
*Assistant Examiner* — Alan Snyder
(74) *Attorney, Agent, or Firm* — Womble Carlyle

(57) ABSTRACT

A cutting insert is suitable for 90° shoulder milling. The cutting insert includes two end surfaces: first and second end surfaces; a peripheral side surface extending therebetween; and a cutting edge formed at an intersecting ridge portion between the first end surface and the peripheral side surface. The cutting edge is formed so that the first end surface functions as a rake face and a part of the peripheral side surface functions as a flank. A side surface portion of the peripheral side surface adjacent to at least a part of the cutting edge includes a first flank portion adjacent to the cutting edge, a second flank portion, a third flank portion,
(Continued)

and a fourth flank portion in this order from the first end surface side toward the second end surface side.

20 Claims, 11 Drawing Sheets

(52) U.S. Cl.
CPC .. *B23C 2200/125* (2013.01); *B23C 2200/208* (2013.01); *B23C 2210/66* (2013.01); *B23C 2250/16* (2013.01); *Y10T 407/1924* (2015.01); *Y10T 407/23* (2015.01)

(58) Field of Classification Search
CPC ........ B23C 2200/125; B23C 2200/208; B23C 2200/0477; B23C 2200/286; B23C 2200/161; Y10T 407/1924
See application file for complete search history.

(56) References Cited

U.S. PATENT DOCUMENTS

| | | | |
|---|---|---|---|
| 8,101,291 B2* | 1/2012 | ÅKesson | ............... C22C 29/08 407/119 |
| 2004/0131431 A1 | 7/2004 | Satran | |
| 2007/0248425 A1* | 10/2007 | Andersson | ............... B23C 5/06 407/113 |
| 2008/0170916 A1 | 7/2008 | Ballas et al. | |

OTHER PUBLICATIONS

International Search Report in PCT/JP2013/073422, dated Sep. 24, 2013.

* cited by examiner

CUTTING INSERT AND INDEXABLE ROTARY CUTTING TOOL

RELATED APPLICATIONS

This is a 371 US National Phase of International Patent Application No. PCT/JP2013/073422 filed Aug. 30, 2013, and published as WO2014/050438A1 on Apr. 3, 2014, which claims priority to JP 2012-213413, filed Sep. 27, 2012. The contents of the aforementioned application are incorporated by reference in their entirety.

TECHNICAL FIELD

The present invention relates to a cutting insert and an indexable rotary cutting tool. More specifically, the present invention relates to a cutting insert used for 90° shoulder milling, and an indexable rotary cutting tool mounting the cutting insert detachably.

BACKGROUND ART

Conventionally, indexable rotary cutting tools have been used in 90° shoulder milling operations with the aim of cutting a machined side wall surface of a workpiece at a right angle relative to a machined bottom wall surface. Patent Literatures 1 to 3 each disclose an example of a cutting insert used in the cutting work as described above. The cutting inserts disclosed in these Patent Literatures each have a configuration in which a flank, which continues to a major cutting edge, is divided into three stages in a direction of the central line of the insert. More specifically, the flank, which continues to the major cutting edge, is configured to consist of: a twisted face portion which is a first flank portion, is provided along the major cutting edge and has a relief angle gradually varying along the major cutting edge; a curved surface portion which is a second flank portion and connected with the twisted face portion and a flat surface portion; and a flat surface portion which is a third flank portion and brought into contact with a side wall surface of an insert mounting seat of a tool body.

CITATION LIST

Patent Literature

PTL 1: Japanese Patent Laid-Open No. 2008-254128
PTL 2: Japanese Patent Laid-Open No. 2008-254129
PTL 3: Japanese Patent Laid-Open No. 2008-213078

SUMMARY OF INVENTION

Technical Problem

Incidentally, in the case of 90° shoulder milling, the cutting edge angle is 90°, and hence, most of the cutting force acts in the radial direction, in which tool rigidity is low, with the rotational axis of the rotary cutting tool being the center. Thus, chatter is more likely to occur as compared with other rotary cutting. Furthermore, in such 90° shoulder milling, there are many cases where machining is performed under a condition where chatter is more likely to occur, such as wall surface machining employing a long overhang tool, and machining performed on thin workpieces. Moreover, if the depth of cut in the radial direction is increased for increasing efficiency, chatter is more likely to occur due to an increase in a regenerative effect of chatter. Once chatter occurs, quality of surface finish or tool life largely deteriorates, and hence, suppression of chatter is an important issue in 90° shoulder milling.

However, none of the cutting inserts disclosed in Patent Literatures 1 to 3 have a configuration effective against the issue concerning the chatter described above. Furthermore, if the size of the cutting insert described in each of Patent Literatures 1 to 3 is directly reduced, the thickness of the cutting insert becomes excessively thin, and the overall strength thereof becomes insufficient, so that chatter is much more likely to occur. In other words, miniaturization of the insert causes the issue of chatter to be more serious.

The present invention has been made in view of the problem described above, and has an object to provide a cutting insert capable of effectively suppressing chatter, and an indexable rotary cutting tool mounting this cutting insert detachably.

Solution to Problem

According to a first aspect of the present invention, there is provided a cutting insert, including:
a first end surface and a second end surface facing opposite to each other;
a peripheral side surface (extending between the first end surface and the second end surface; and
a cutting edge formed at an intersecting ridgeline portion between the first end surface and the peripheral side surface, the cutting edge being formed so that the first end surface functions as a rake face and a part of the peripheral side surface functions as a flank, wherein
a portion of the peripheral side surface adjacent to at least a part of the cutting edge includes at least a first flank portion adjacent to the cutting edge, a second flank portion, a third flank portion, and a fourth flank portion, which are arranged in this order from a side of the first end surface toward a side of the second end surface;
the first flank portion has a slope angle that gradually varies along the cutting edge, and a width that is constant or substantially constant in an area along the cutting edge from the side of the first end surface toward the side of the second end surface;
the slope angle of the first flank portion has a minimum value that falls in a range of not less than 2.0° and not more than 6.0°, and the slope angle of the first flank portion has a maximum value that falls in a range of not less than 10.5° and not more than 14.5°;
the second flank portion connects the first flank portion and the third flank portion;
a slope angle of the third flank portion falls in a range of not less than 0.0° and not more than 11.0°; and
the fourth flank portion has a slope angle greater than the third flank portion.

The width of the first flank portion may be set in a range of not less than 0.1 mm and not more than 0.6 mm.

An inscribed circle may be set in the first end surface when the cutting insert is viewed from a side opposite to the first end surface. It is preferable that a ratio of the diameter of the inscribed circle relative to the thickness of the cutting insert is not less than 1.5 and not more than 2.2.

It is preferable that the second end surface is formed so as to function as a seating surface when the cutting insert is mounted to a tool body, and the second end surface is provided with at least three projections.

Preferably, the cutting edge includes a major cutting edge, an minor cutting edge, and a corner cutting edge connecting the major cutting edge and the minor cutting edge. In this case, it is preferable that the first flank portion is adjacent to at least the major cutting edge. It is preferable that the major cutting edge is formed so as to gradually approach the second end surface with an increasing distance from the corner cutting edge. Furthermore, it is preferable that the first flank portion is formed so that the slope angle thereof gradually increase with an increasing distance from the corner cutting edge along the major cutting edge.

Preferably, an outline shape of the cutting insert is substantially triangular when the cutting insert is viewed from a side opposite to the first end surface. In this case, the cutting insert may include three cutting edges. Note that the cutting insert according to the present invention may include only one cutting edge. Preferably, the cutting insert according to the present invention includes a plurality of cutting edges, and more preferably, includes at least three cutting edges.

Furthermore, according to a second aspect of the present invention, there is provided an indexable rotary cutting tool including a tool body having at least one insert mounting seat at a leading end portion, with a cutting insert being detachably mounted on the insert mounting seat, wherein the cutting insert is the cutting insert described above;

the cutting insert is mounted on the insert mounting seat with an axial rake falling in a range of not less than 6° and not more than 14° and a radial rake falling in a range of not less than −8° and not more than 0°; and a relief angle of the first flank portion of the cutting insert mounted on the insert mounting seat is not less than 5° and not more than 13°.

BRIEF DESCRIPTION OF DRAWINGS

FIGS. 5A and 5B illustrate sectional views of the cutting insert in FIG. 1, in which FIG. 5A is a sectional view of the cutting insert in FIG. 1 taken along a line V-V in FIG. 2, and FIG. 5B is an enlarged view of a first flank portion in FIG. 5A and its surroundings;

DESCRIPTION OF EMBODIMENTS

Hereinbelow, an embodiment according to the present invention will be described in detail with reference to the drawings.

Figure 1:
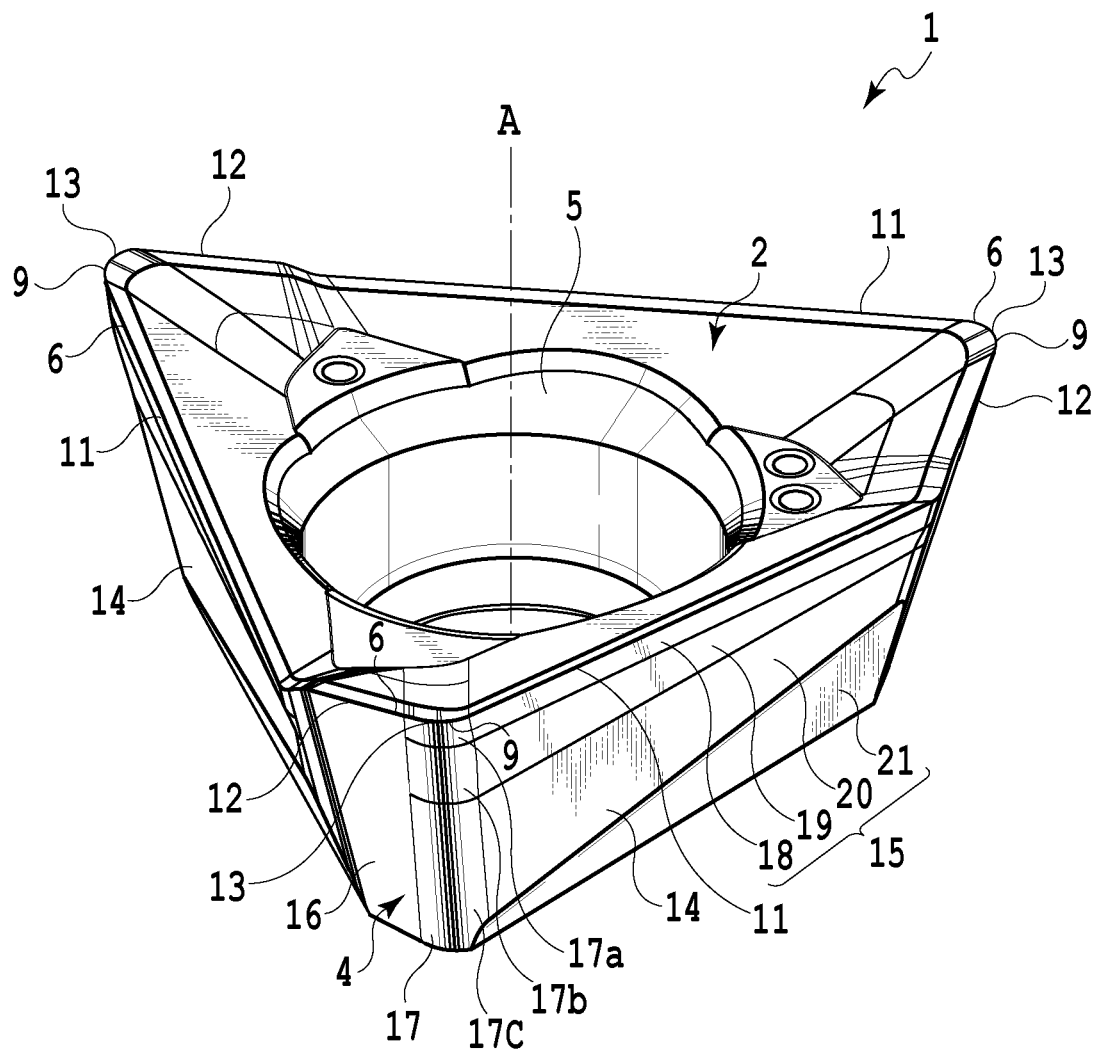
FIG. 1 illustrates a perspective view of a cutting insert according to an embodiment of the present invention.
Figure 2:
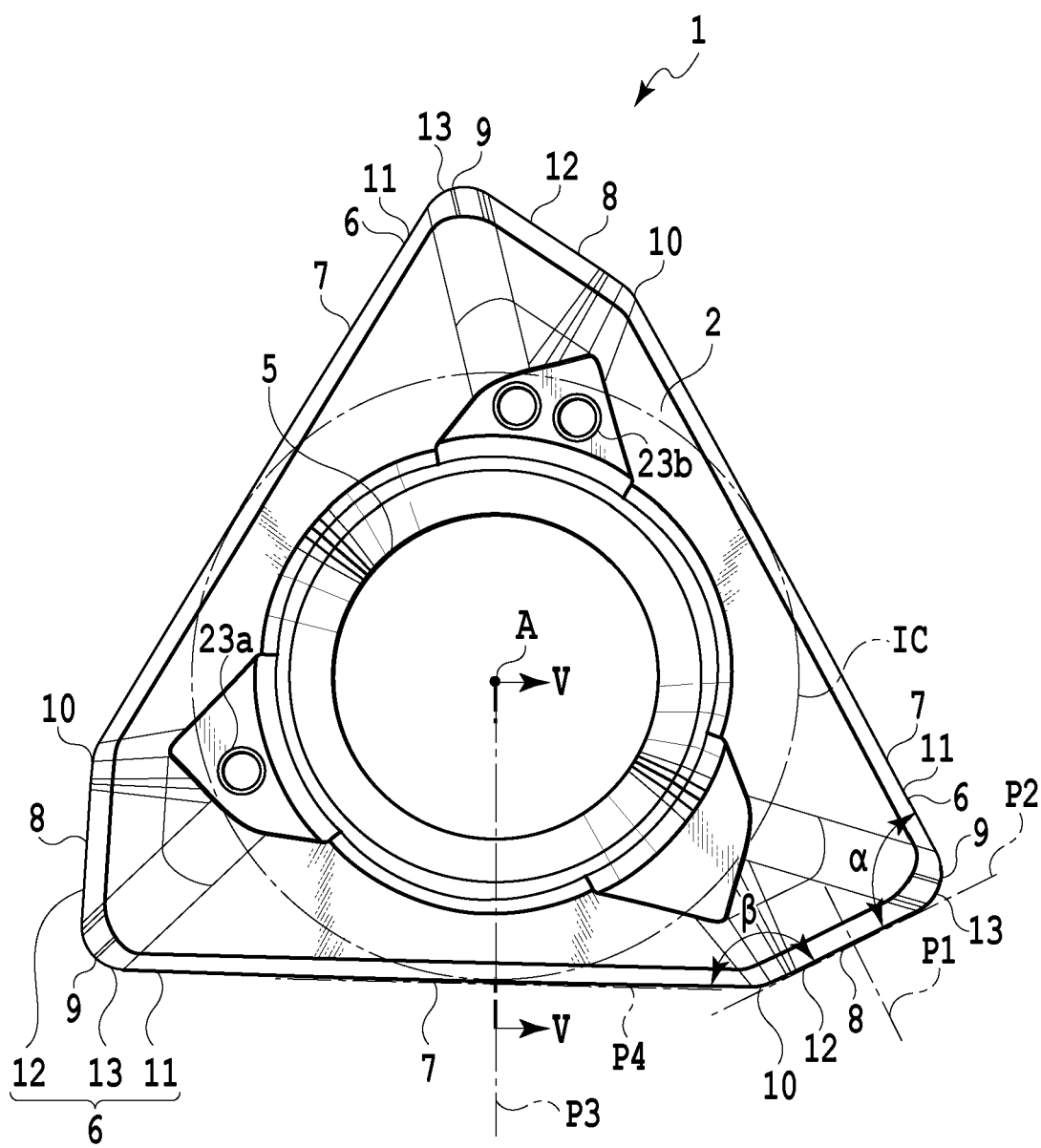
FIG. 2 illustrates a plan view of the cutting insert in FIG. 1.

As illustrated in FIGS. 1 to 4, a cutting insert 1 according to this embodiment comprises two opposite end surfaces 2 and 3 or the end surfaces 2 and 3 facing opposite to each other, and a peripheral side surface 4 connecting the end surfaces 2 and 3 or extending therebetween. Hereinbelow, one end surface (corresponding to a first end surface in the present invention) 2 facing upward in FIG. 1 and FIG. 2 is referred to as an upper surface, and the other end surface (corresponding to a second end surface in the present invention) 3 is referred to as a lower surface. In the following descriptions, the terms "upper" and "lower" are used on the basis of this relative positional relationship of the upper surface and the lower surface. However, these terms do not limit directions or positions of the cutting insert but are only used to facilitate understanding, and it can be understood that these terms are not intended to limit the present invention.

In the cutting insert 1, a mounting hole 5 serving as a through-hole is formed so as to penetrate the upper surface 2 and the lower surface 3. Thus, a substantially circular opening serving as the mounting hole 5 is formed at substantially the central portion of each of the upper surface 2 and the lower surface 3.

As can be understood from FIG. 2, in the plan view of the cutting insert 1, in other words, when the cutting insert is viewed from the side opposite to the upper surface 2, the upper surface 2 of the cutting insert 1 has a substantially triangular outline shape. In a more precise sense, the upper surface 2 has a substantially hexagonal outline shape in the plan view thereof. However, because a difference in length is large between the long side portion and the short side portion, the upper surface 2 is regarded as having the substantially triangular outline shape. The lower surface 3 has the same type of shape as the upper surface 2 in the plan view thereof, in other words, in FIG. 4, and is apparently smaller in size than the upper surface 2.

A cutting edge 6 is formed at an intersecting ridge portion between the upper surface 2 and the peripheral side surface 4. In the case of the cutting insert 1, three cutting edges 6 are formed. These three cutting edges 6 are arranged around the central axis A of the mounting hole 5 in a rotational symmetrical manner. In the case where the cutting insert 1 is attached to the tool body so that one cutting edge of the three cutting edges 6 is used, the upper surface 2 is able to function as a rake face and part of the peripheral side surface 4 is able to function as a flank in the one operable cutting edge. The lower surface 3 is able to function as a seating surface that is brought into contact with a bottom wall surface of an insert mounting seat of the tool body. The cutting insert 1 according to this embodiment is categorized as a so-called positive type. Thus, in the operable cutting edge, a positive relief angle is generally provided from the upper surface 2 side to the lower surface 3 side.

As illustrated in FIG. 2, the upper surface 2 having a substantially triangular shape has a configuration in which each side portion of the substantially triangular shape is divided into a long side portion 7 having a relatively long length and a short side portion 8 having a relatively short length. Thus, the outline of the upper surface 2 as a whole has a shape in which three long side portions 7 and three short side portions 8 are alternately connected. The lengths of the three long side portions 7 are equal, and the lengths of the three short side portions 8 are equal. The long side portions 7 and the short side portions 8 extend along the intersecting ridge portion between the upper surface 2 and the peripheral side surface 4, and are each formed so as to be able to function as the cutting edge. The number of intersecting portions between the long side portions 7 and the short side portions 8 is six in total. At each of three first intersecting portions or first corner portions 9 of the six intersecting portions, the long side portion 7 and the short side portion 8 intersect in a manner such that the internal angle α in FIG. 2 is an acute angle. At each of the remaining three second intersecting portions or second corner portions 10, the long side portion 7 and the short side portion 8 intersect in a manner such that the internal angle β in FIG. 2 is an obtuse angle. The first corner portions 9 with an acute angle and the second corner portions 10 with an obtuse angle are arranged alternately. Each of the first corner portions 9 with the acute angle is a cutting corner, and can be involved in cutting. On the other hand, each of the second corner portions 10 with the obtuse angle is substantially not involved in cutting. All the internal angles of the three first corner portions 9, in other words, all the corner angles of the cutting corners are equal to each other, and all the internal angles of the three second corner portions 10 are also equal to each other. In this embodiment, the corner angle α of the cutting corner in FIG. 2 is an acute angle of 88°. However, the angle α of the cutting corner is not limited to this angle, and it may be possible to set the angle α to be a right angle or obtuse angle. The first corner portion 9, namely, the cutting corner is designed so that the cutting edge 6 is suitable for 90° shoulder milling. Furthermore, in this embodiment, the angle β of the second corner portion 10 in FIG. 2 is an obtuse angle of 152°. However, the angle β of the second corner portion 10 is not limited to this angle, and can be appropriately adjusted according to the angle α of the first corner portion 9. As described above, the cutting insert 1 according to this embodiment has three long side portions 7 and three short side portions 8 alternately connected in a plan view, thereby having a substantially triangular shape having first corner portions 9 each serving as a cutting corner at respective apex portions.

For one first corner portion 9, namely, one cutting corner, one cutting edge 6 is formed. The cutting edge 6 partially extends with respect to the first corner portion 9 of the upper surface 2. The cutting edge 6 includes a major cutting edge 11, a minor cutting edge 12, and a corner cutting edge 13 connecting them to each other. The corner cutting edge 13 extends along the first corner portion 9. The major cutting edge 11 extends along the long side portion 7. The minor cutting edge 12 extends along the short side portion 8.

The corner cutting edge 13 of the cutting edge 6 is designed so as to be able to be involved in cutting a corner portion at which a side wall surface and a bottom wall surface of a workpiece, not illustrated, intersect. The major cutting edge 11 is designed so as to be able to be involved in cutting a side wall surface of a workpiece. In the cutting insert 1 according to this embodiment, the entire long side portion 7 functions as a major cutting edge. However, the cutting insert 1 is not limited to this, and part of the long side portion 7 may function as the major cutting edge 11. Furthermore, in the cutting insert 1, the major cutting edge 11 has a convexly curved shape that slightly expands entirely outwardly in a plan view of the cutting insert 1. In the cutting insert 1 according to this embodiment, the length of the major cutting edge 11 is 6.2 mm. However, naturally, this length can be appropriately changed according to a required cutting condition. The minor cutting edge 12 is designed so as to be able to be involved in cutting a bottom wall surface (or a flat surface to be machined) of a workpiece. In this embodiment, the length of the minor cutting edge 12 is 1.2 mm. However, naturally, this length can be appropriately changed according the size of the cutting insert 1. The corner cutting edge 13 is curved at a certain curvature (radius of a corner). In the cutting insert 1 according to this embodiment, the dimension of the radius of a corner is 0.4 mm. However, this dimension can be appropriately changed according to the size of the curve provided at the corner portion of the workpiece. As described above, the cutting insert 1 according to this embodiment has three cutting corners, namely, cutting edges 6 on the upper surface 2, and these cutting edges can be used in turn. In other words, the cutting insert 1 is an indexable cutting insert. Each of the cutting edges may be provided with land or honing, and these can be appropriately set according to types of work material or machining form.

Figure 3:
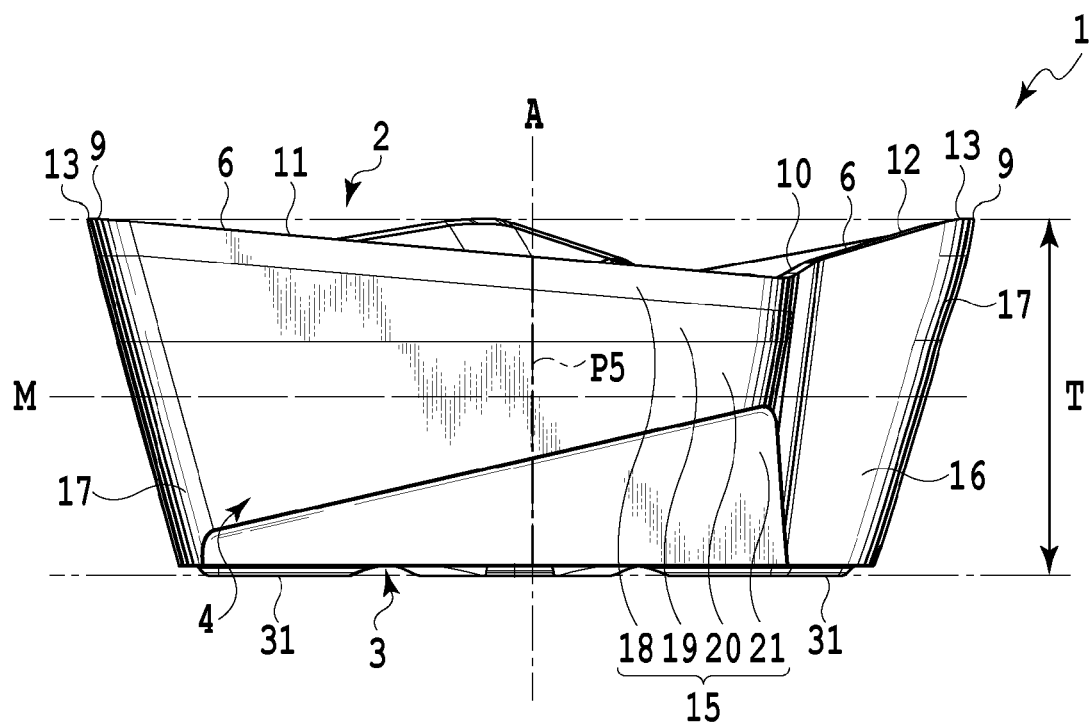
FIG. 3 illustrates a front view of the cutting insert in FIG. 1.

Here, a plane perpendicular to the axis A and extending between the upper surface 2 and the lower surface 3 of the cutting insert 1 is defined as an median plane M. In particular, the median plane M is herein defined so as to substantially pass through the central position between the upper surface 2 and the lower surface 3. As illustrated in FIG. 3, when the cutting insert 1 according to this embodiment is viewed from the front (or viewed from the side surface), in other words, when the cutting insert 1 is viewed in a direction perpendicular to the axis A, the median plane M is illustrated as a straight line perpendicular to the axis A. In the following description, this straight line and the median plane M can be used as a reference line or a reference plane.

In FIG. 3 illustrating the cutting insert 1 in a side view, as for the distance between each of the cutting edges 6 and the median plane M, the distance between the outermost portion of the corner cutting edge 13 of the first corner portion 9 and the median plane M is the largest. However, the distance between the cutting edge 6 and the median plane M represents a distance therebetween in the direction of the axis A. Furthermore, each of the cutting edges 6 is formed so that the distance between the cutting edge 6 and the median plane M gradually reduces with an increasing distance from the first corner portion 9. Thus, with an increasing distance from the first corner portion 9 or the corner cutting edge 13 along the major cutting edge 11, the distance between the cutting edge 6 and the median plane M reduces, and with an increasing distance along the minor cutting edge 12, the distance between the cutting edge 6 and the median plane M reduces. Furthermore, at a point where the distance between the major cutting edge 11 (or the minor cutting edge 12) of one cutting edge 6 and the median plane M is the smallest (in other words, the nearest portion to the median plane M), the major cutting edge 11 (or the minor cutting edge 12) merges or connects with an minor cutting edge 12 (or a major cutting edge 11) of the adjacent cutting edge 6. This connecting point is the second corner portion 10 described above. As described above, in the cutting insert 1 according to this embodiment, each of the cutting edges 6 is provided with an inclination so that the cutting edge 6 approaches the median plane M or the lower surface 3 with an increasing distance away from the first corner portion 9 or the cutting corner, and is nearest to the median plane M or the lower surface 3 at the second corner portion 10. Note that it may be possible for the major cutting edge 11 to have not a curved shape but a straight shape. Furthermore, it may be also possible for the minor cutting edge 12 to have a straight shape or a curved shape. Moreover, it may be possible to entirely shape the slope of the cutting edge 6 at a constant angle, or it may be possible to employ a configuration in which the angle changes at some middle point in the cutting edge.

The peripheral side surface 4 has three side surfaces 14 so as to correspond to the three cutting edges 6. Each of the side surfaces 14 generally extends between the lower surface 3 and one corresponding cutting edge 6. The side surface 14 extends along the corresponding cutting edge 6, and includes a main side-surface portion 15 adjacent to the major cutting edge 11, an minor side-surface portion 16 adjacent to the minor cutting edge 12, and a corner side-surface portion 17 adjacent to the corner cutting edge 13. These side surface portions 15, 16, and 17 continue in the circumferential direction.

In the case where the corresponding cutting edge 6 is the operable cutting edge, the minor side-surface portion 16 is formed so as to function as a flank with respect to the minor cutting edge 12 of the operable cutting edge 6. The minor side-surface portion 16 is configured as a single surface, and extends from the upper surface 2 up to the lower surface 3. The slope angle of the minor side-surface portion 16 can be defined on a plane that is set so as to be in parallel to the axis A and form a right angle with respect to the minor cutting edge 12 in FIG. 2 (an example of this plane is illustrated as the plane P1 in FIG. 2), and is 15° here. Note that the slope angle of the minor side-surface portion 16 on the plane P1 is set with respect to the plane P2, which is set so as to pass through the intersecting portion between the minor cutting edge 12 and the plane P1 in FIG. 2 and be perpendicular to the plane P1. The plane P2 is in parallel to the axis A. The slope angle of the minor side-surface portion 16 can be changed as appropriate. The slope angle of the minor side-surface portion 16 corresponds to a relief angle with respect to the minor cutting edge 12.

The main side-surface portion 15 consists of a first flank portion 18, a second flank portion 19, a third flank portion 20, and a fourth flank portion 21. The main side-surface portion 15 is configured such that these flank portions 18, 19, 20, and 21 are arranged in this order from the upper surface 2 side toward the lower surface 3 side. Each of the slope angles of the first to fourth flank portions 18, 19, 20, and 21 can be defined on a plane that is set so as to be in parallel to the axis A and form a right angle with respect to the major cutting edge 11 in FIG. 2 (an example of this plane is illustrated as the plane P3 in FIG. 2). In addition, each of the slope angles of the first to fourth flank portions 18, 19, 20, and 21 on the plane P3 is set with respect to the plane P4, which is set so as to pass through the intersecting portion between the major cutting edge 11 and the plane P3 in FIG. 2 and be perpendicular to the plane P3. The plane P4 is in parallel to the axis A. Note that, in FIG. 2, the plane P4 is illustrated as the tangential line of the inscribed circle IC, which will be described later, and the plane P3 passes through the contact point between the inscribed circle IC and the major cutting edge 11.

Figure 5A:
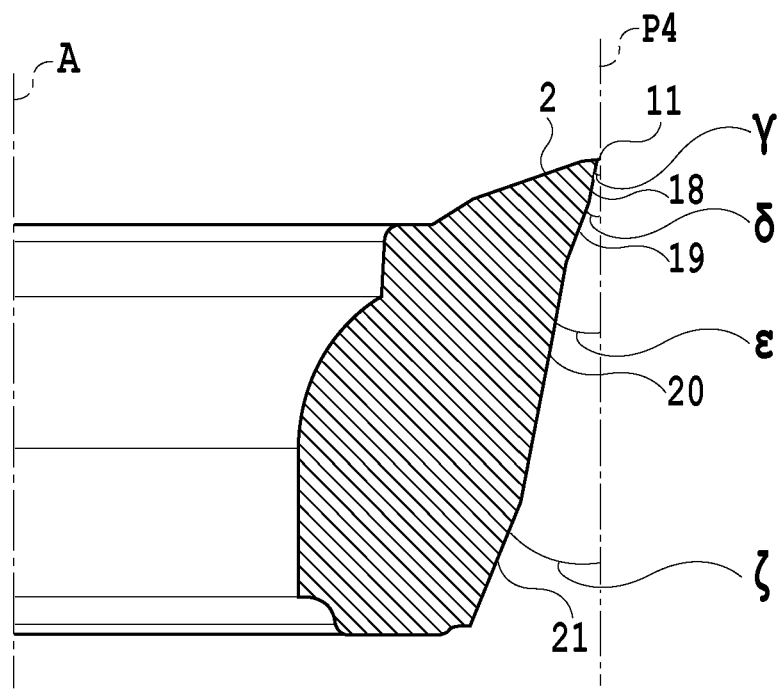
Figure 5B:
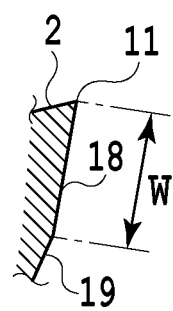

The first flank portion 18 is adjacent to the major cutting edge 11, and is a band-shaped surface, in an area along the major cutting edge 11, having a predetermined width or length W from the upper surface 2 side toward the lower surface 3 side. In particular, in the cutting insert 1, the first flank portion 18 has in an area along the major cutting edge 11 a fixed width from the upper surface 2 side toward the lower surface 3 side. Here, with reference to FIGS. 5A and 5B, the first flank portion 18 will be described. FIG. 5A is a sectional view of the cutting insert 1 taken along the line V-V in FIG. 2, and FIG. 5B is an enlarged view of the first flank portion 18 and its surroundings in FIG. 5A. Note that FIG. 5A illustrates the shape of the main side-surface portion 15 taken along a flat plane P5 in FIG. 3, and illustrates the plane P4 in FIG. 2 as a straight line. However, in FIGS. 5A and 5B, a portion of the upper surface 2 and a portion of the lower surface 3, which are supposed to be shown on the back side of the paper surface, are omitted.

As illustrated in FIG. 5B, the width W of the first flank portion 18 from the upper surface 2 side toward the lower surface 3 side is a length of the first flank portion 18 along the first flank portion 18 on a plane set so as to be in parallel to the axis A and form a right angle with respect to the major cutting edge 11 in a plan view of the cutting insert 1. As described above, the first flank portion 18 is formed so that the width W does not vary along the major cutting edge 11. Thus, the width of the first flank portion 18 at a portion close to the first corner portion 9 is equal to the width of the first flank portion 18 at a portion close to the second corner portion 10. Note that this does not exclude that the width of the first flank portion 18 varies along the major cutting edge 11, for example, the width slightly varies. It may be possible to form the first flank portion 18 so that the width W of the first flank portion 18 has a substantially constant width in an area along the major cutting edge 11. In this embodiment, the width W of this first flank portion 18 is 0.3 mm. The width of the first flank portion 18 preferably falls in a range of not less than 0.1 mm and not more than 0.6 mm, and more preferably falls in a range of not less than 0.1 mm and not more than 0.5 mm. More preferably, the width W of this first flank portion 18 falls in a range of 0.2 mm to 0.4 mm.

Furthermore, a slope angle $\gamma$ of this first flank portion 18 gradually increases along an adjacent major cutting edge 11 from the first corner portion 9 side toward the second corner portion 10 side. Correspondingly, in FIG. 4, the first flank portion 18 is illustrated mostly linearly on the first corner portion 9 side, and is illustrated as having a certain width on the second corner portion 10 side. In the cutting insert 1, the slope angle of the first flank portion 18 varies from 4.0° to 12.5° from the first corner portion 9, namely, from the cutting corner side toward the second corner portion 10 side. It is preferable that the slope angle of the first flank portion 18 falls in a range of not less than 2.0° and not more than 6.0° at an end portion on the first corner portion 9 side, and falls in a range of not less than 10.5° and not more than 14.5° at an end portion on the second corner portion 10 side. Note that this slope angle of the first flank portion 18 corresponds to a relief angle concerning the first flank portion 18 of the major cutting edge 11.

The second flank portion 19 serves as a connecting surface for connecting the first flank portion 18 and the third flank portion 20. Here, the second flank portion 19 substantially smoothly connects the first flank portion 18 and the third flank portion 20. More specifically, the second flank portion 19 is formed so that the slope angle of the main side-surface portion 15 substantially smoothly varies from the first flank portion 18 toward the third flank portion 20. Furthermore, the second flank portion 19 is designed so as to also have a function of keeping the width W of the first flank portion 18 constant and keep the width of the first flank portion 18 constant. In the cutting insert 1, a slope angle $\delta$ of the second flank portion 19 is formed so as to be greater than the slope angle $\gamma$ of the first flank.

The third flank portion 20 is designed so as to function as a abutment surface (or a restraining surface) that comes into abutment with a side wall surface of the insert mounting seat of the tool body, which will be described later. A slope angle $\epsilon$ of this third flank portion 20 is constant in an area along the cutting edge, in other words, is set so that the slope angle on the first corner portion 9 side does not differ from the slope angle of the second corner portion 10 side, and is 11° in this embodiment. Preferably, the slope angle $\epsilon$ of the third flank portion 20 is not less than 0.0° and not more than 11.0°.

It may be possible to vary the slope angle of the third flank portion along the cutting edge. Furthermore, the third flank portion 20 is formed so as to have an area larger than the first flank portion 18 and the second flank portion 19.

The fourth flank portion 21 is a surface on which a slope angle thereof is greater than that of the third flank portion 20. In the cutting insert 1 according to this embodiment, the slope angle of the fourth flank portion 21 is constant in an area along the cutting edge, and is 20.0°. The slope angle of the fourth flank portion 21 is set so as to be greater than the slope angle of the third flank portion 20. The slope angle of the fourth flank portion may vary along the cutting edge. This fourth flank portion 21 is formed so that the width (defined similarly to the width W of the first flank portion 18) thereof gradually increases along a related major cutting edge 11 from the first corner portion 9 side toward the second corner portion 10 side (see FIG. 3 and FIGS. 5A and 5B). Furthermore, of the first flank portion 18 to the fourth flank portion 21, the third flank portion 20 is formed so as to have the largest area. However, the fourth flank portion 21 may have a larger area than the third flank portion 20.

Furthermore, as can be understood from FIG. 1 and FIG. 3, the corner side-surface portion 17 includes three flank portions 17a, 17b, and 17c that adapt to the first to third flank portions 18, 19, and 20 of the main side-surface portion 15, respectively. The corner side-surface portion 17 is configured to smoothly connect the main side-surface portion 15 and the minor side-surface portion 16.

When the cutting insert 1 is viewed from the side opposite to the upper surface 2, in other words, in FIG. 2, the inscribed circle IC can be set on the upper surface 2. In the cutting insert 1, the diameter of the inscribed circle IC is 5.36 mm, and the thickness T of the cutting insert 1 is 3.2 mm. Thus, the ratio of the diameter of the inscribed circle IC relative to the thickness of the cutting insert 1 is approximately 1.7. It is preferable that the ratio of the diameter of the inscribed circle IC relative to the thickness of the cutting insert 1 (diameter of inscribed circle/thickness of cutting insert) falls in a range of not less than 1.5 and not more than 2.2. Note that, as illustrated in FIG. 3, the thickness T of the cutting insert 1 is a length from the first corner portion 9 to a projection on the lower surface 3, which will be described later, in a direction of the axis A.

With respect to this inscribed circle IC, the width W of the first flank portion 18 can be set. As described above, it is preferable to set the width W of the first flank portion 18 in a range of not less than 0.1 mm and not more than 0.6 mm. Moreover, the ratio of the diameter of the inscribed circle IC relative to such a width W of the first flank portion 18 (diameter of inscribed circle/width of first flank portion 18) preferably falls in a range of not less than 14 and not more than 24. It is preferable to set this ratio by taking the balance of the insert into consideration.

Furthermore, it is possible to provide the minor cutting edge 12 with a wiper edge. Providing the wiper edge makes it possible to improve a surface roughness of a machined surface. This wiper edge may be linear or curved. In the case of providing the minor cutting edge 12 with the wiper edge, there is a possibility that the internal angle of the first corner portion 9, namely, the cutting corner is an obtuse angle depending on a mounting posture of the cutting insert 1.

Furthermore, as illustrated in FIG. 2, identification marks 23a and 23b for corners used may be applied to near the first corner portions 9, namely, the cutting corners on the upper surface 2. Designs of these identification marks 23a and 23b differ for each of the first corner portions 9. With this arrangement, the order of using the cutting corners of the three first corner portions 9 can be identified, and it is possible to prevent a worker from erroneously reusing a cutting corner that has been once used. Furthermore, it may be possible to appropriately vary the angle, namely, a rake angle or the shape of the upper surface 2, which can function as a rake face, according to cutting conditions, types of work material, or the like. It may be possible to form projections and depressions such as a chip breaker on the upper surface 2 as necessary. Furthermore, in this embodiment, the cutting insert 1 has a substantially triangular shape in a plan view. However, the shape of the cutting insert 1 is not limited to this, and for example, other polygonal shape such as a quadrilateral shape or a pentagon shape, is possible. However, in the case where the cutting insert is used in 90° shoulder milling, it is desirable that the outline shape of the upper surface is a substantially triangular outline shape as with the cutting insert 1, or a substantially quadrilateral outline shape.

Figure 4:
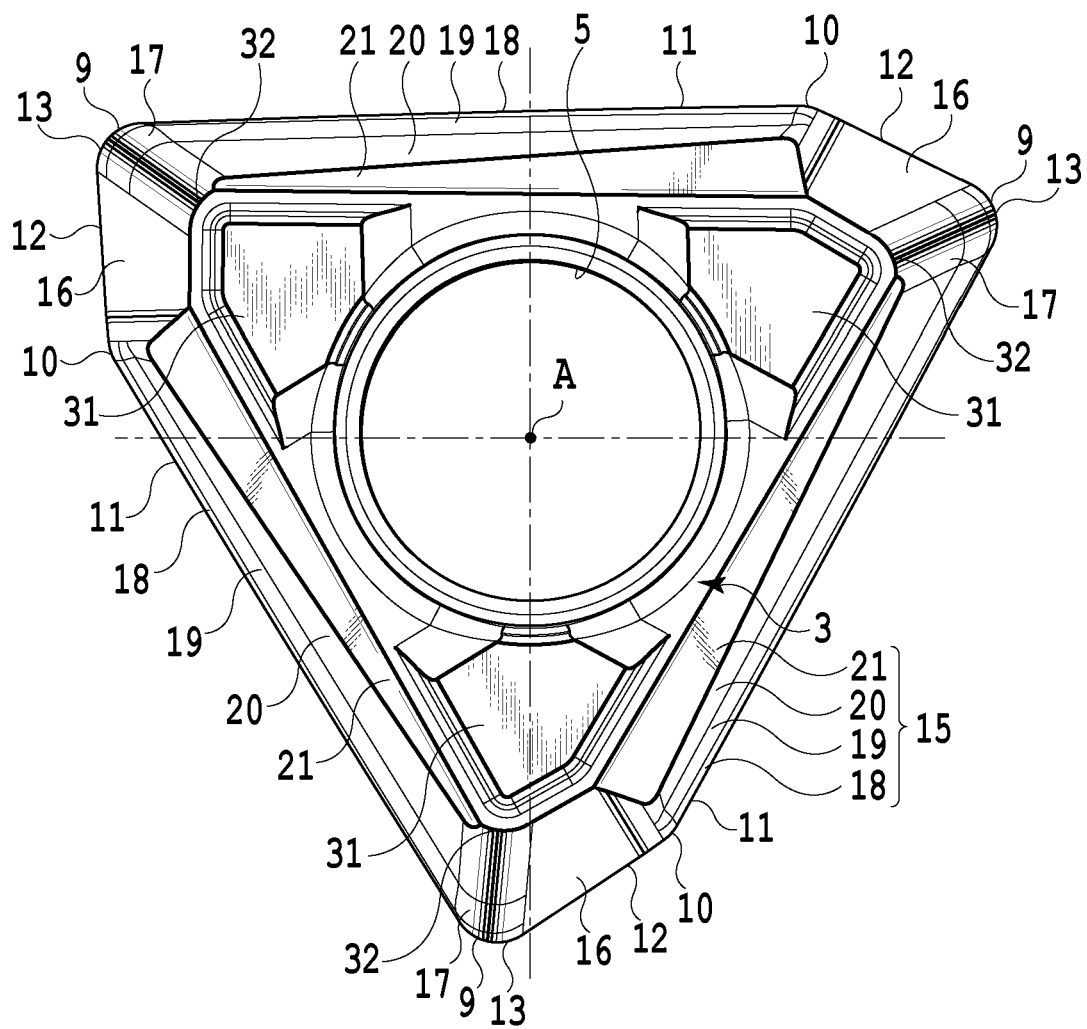
FIG. 4 illustrates a bottom view of the cutting insert in FIG. 1.

As illustrated in FIG. 3 and FIG. 4, projections 31 are formed on the lower surface 3. Each of the projections 31 is provided close to a corner portion 32 of the lower surface 3 corresponding to the first corner portion 9 of the upper surface 2. Note that, in the cutting insert 1, in FIG. 4, the corner portion 32 is positioned in a manner such that between the first corner portion 9 of the upper surface 2 and the axis A, a corresponding corner portion 32 of the lower surface 3 is placed. Thus, in the case of this embodiment, three projections 31 are provided on the lower surface 3. Each of the projections 31 is formed so as to protrude downward in the direction of the axis A. In addition, the surface of the projection 31 at the lower end thereof, namely, the bottom surface thereof is formed so as to be flat, and this bottom surface is brought into abutment with a bottom wall surface of the insert seat of the tool body. In the cutting insert 1 according to this embodiment, the amount of projection of each of the projections 31 in the direction of the axis A is set to 0.1 mm. However, this amount can be appropriately changed.

It is preferable that at least a portion of the cutting insert 1 according to this embodiment including the cutting edge 6 is made of a hard material such as a cemented carbide, a coated cemented carbide, cermet, ceramic, and an ultrahigh-pressure sintered body containing diamond or cubic boron nitride.

Figure 6:
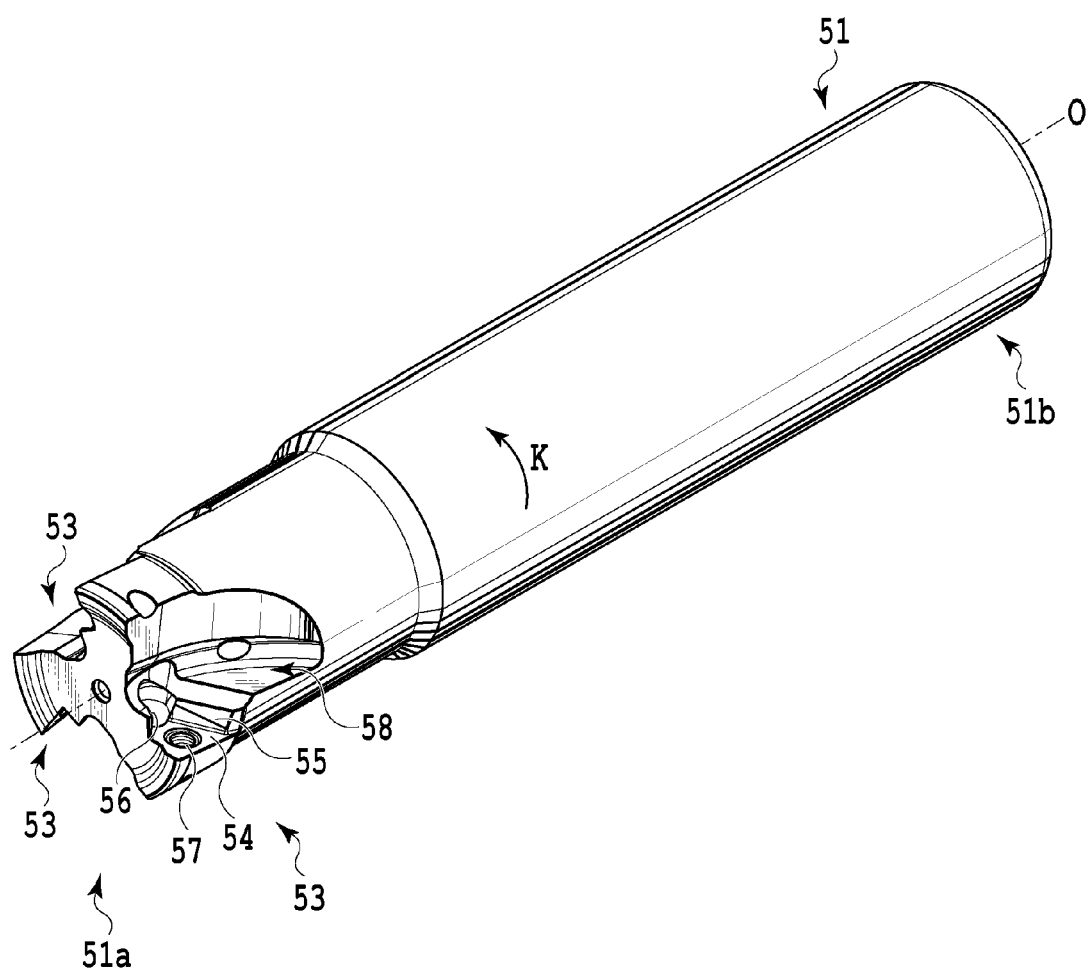
FIG. 6 illustrates a perspective view of a tool body of a rotary cutting tool according to an embodiment of the present invention to which the cutting insert in FIG. 1 is mounted.
Figure 7:
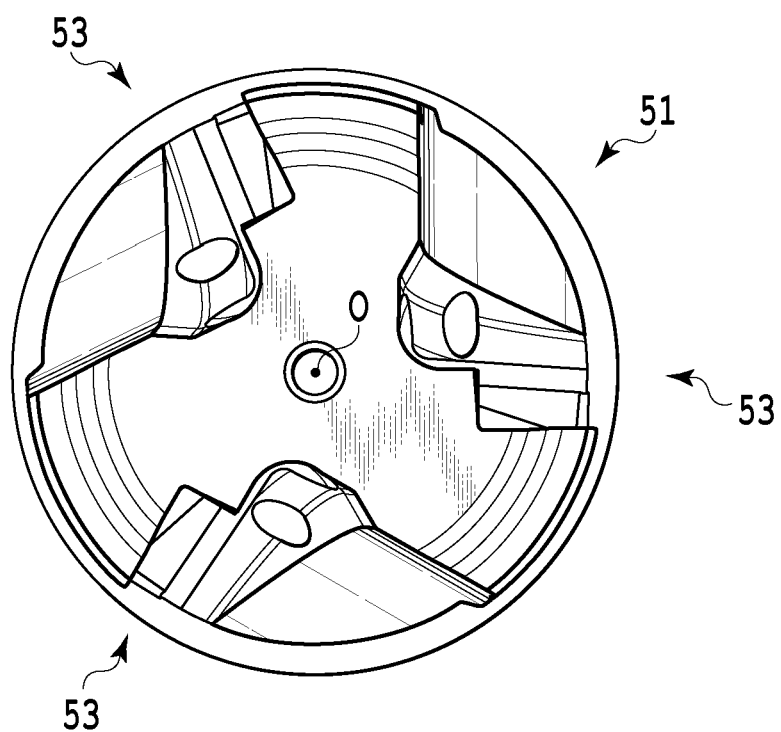
FIG. 7 illustrates a front view of the tool body in FIG. 6.
Figure 8:
FIG. 8 illustrates a side view of the tool body in FIG. 6.
Figure 9:
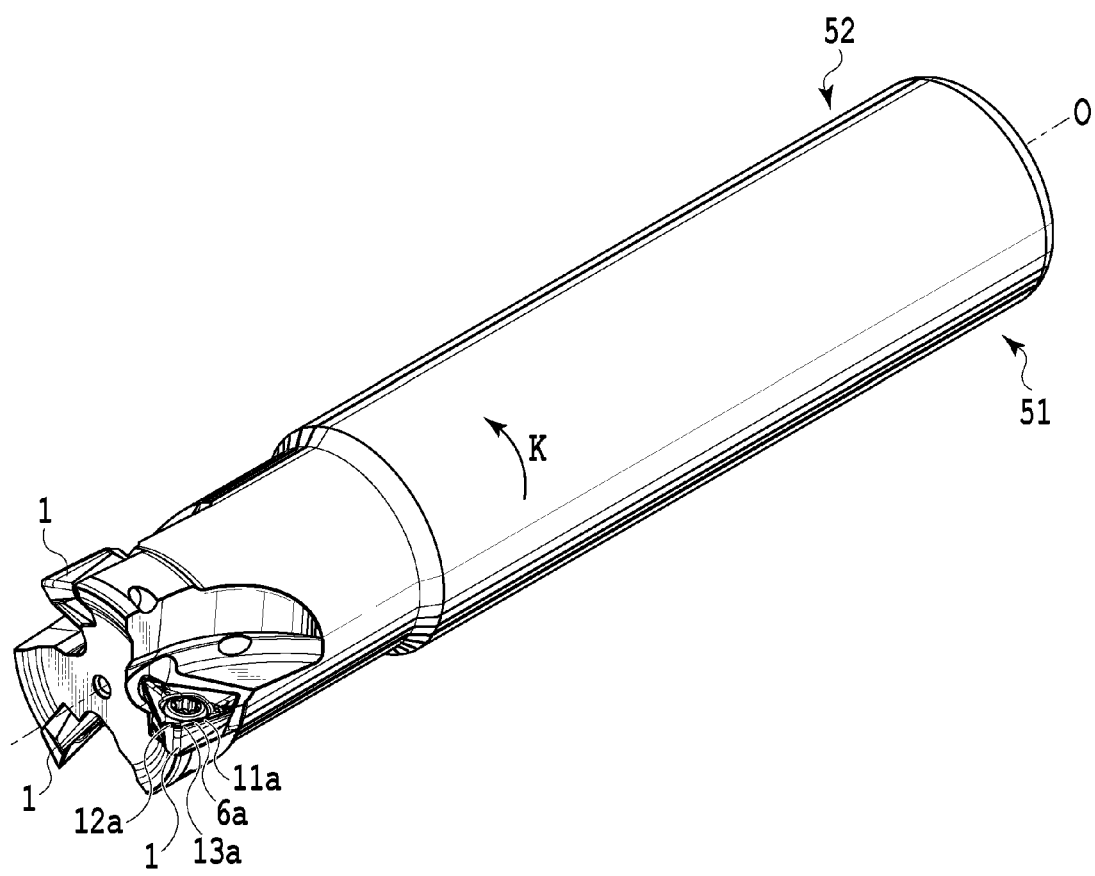
FIG. 9 illustrates a perspective view of a rotary cutting tool according to an embodiment of the present invention in which the cutting insert in FIG. 1 is mounted to the tool body in FIG. 6.
Figure 10:
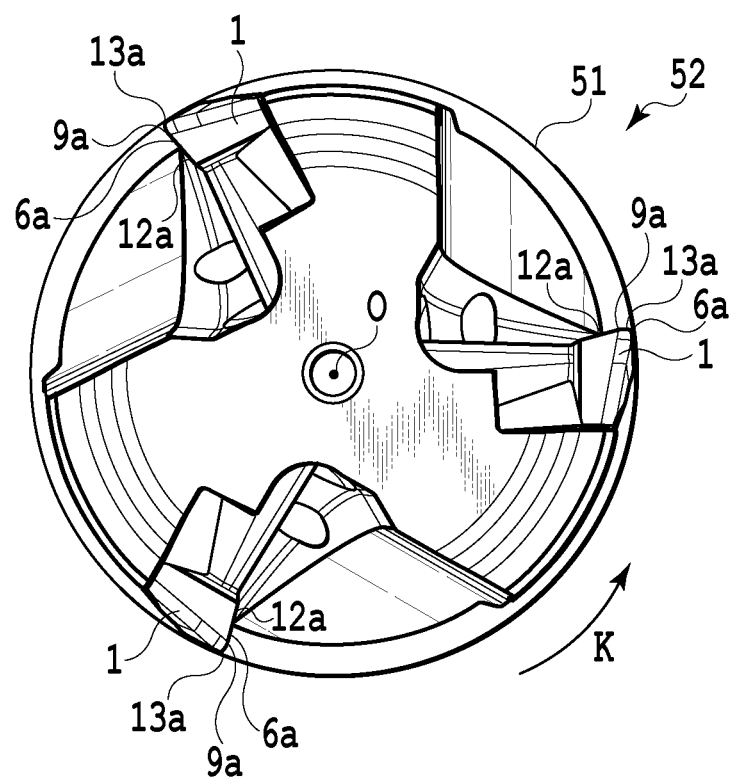
FIG. 10 illustrates a front view of the rotary cutting tool in FIG. 9.
Figure 11:
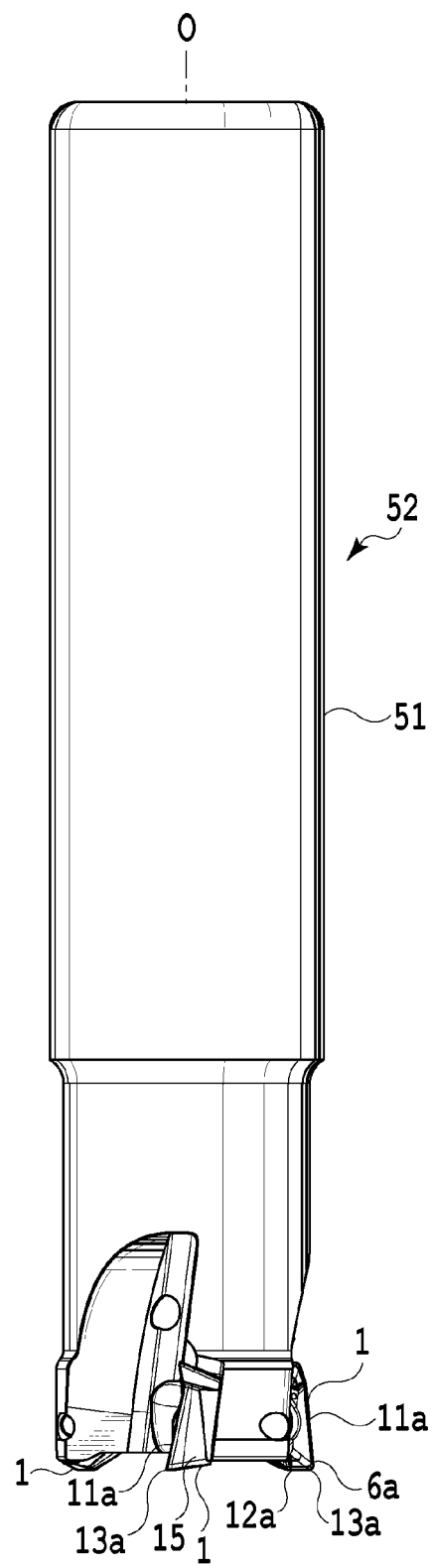
FIG. 11 illustrates a side view of the rotary cutting tool in FIG. 9.

Next, with reference to the drawings, descriptions will be given of an indexable rotary cutting tool 52 including a tool body 51 to which the cutting insert 1 described above is detachably mounted. FIG. 6 to FIG. 8 each illustrates the tool body 51. FIG. 9 to FIG. 11 each illustrates the indexable rotary cutting tool 52 according to this embodiment, in which the cutting insert 1 is mounted to the tool body 51.

The tool body 51 basically has a substantially cylindrical shape, and the rotational axis O extending from a leading end portion 51a to a rear end portion 51b is set. The rear end side of the tool body 51 is a portion to be mounted to a machine tool. The leading end side of the tool body 51 is provided with three insert mounting seats 53, to each of which the cutting insert 1 can be mounted. As described above, the indexable rotary cutting tool 52 according to this embodiment is of three-blade type to which three cutting inserts 1 are mounted, and in which three operable cutting edges are formed. In the cutting tool 52 according to this embodiment, the three insert mounting seats 53 are arranged at substantially equal intervals in the front view of the tool body 51 in FIG. 7, in particular, when viewed from the leading end surface side. However, it may be possible to arrange the three insert mounting seats 53 at unequal intervals. Furthermore, the number of insert mounting seats 53 is not limited to three, and can be set to any other given number. In other words, the indexable rotary cutting tool according to the present invention is not limited to three blades. It may be possible to provide the cutting tool according to the present invention with only one insert mounting seat. However, it is preferable to provide a plurality of insert mounting seats.

The insert mounting seat 53 includes a bottom wall surface 54, and two side wall surfaces 55 and 56 each having a predetermined inclination with respect to the bottom wall surface 54. The bottom wall surface 54 is formed so as to face the front in a tool-rotational direction K. A screw hole 57 for fixing the cutting insert 1 with a screw, which serves as fixing means, is provided at the approximate central portion of the bottom wall surface 54 of the insert mounting seat 53. In this embodiment, since the cutting insert 1 has a substantially triangular shape, the bottom wall surface 54 of the insert mounting seat 53 has a substantially triangular shape. However, it may be possible to appropriately change the shape of the insert mounting seat 53 according to the shape of the cutting insert 1.

The first side wall surface 55 of the insert mounting seat 53 is a surface that faces the leading end side of the tool as well as the radially outward side of the tool. The second side wall surface 56 of the insert mounting seat 53 is provided at a position closer to the leading end side of the tool than the first side wall surface 55, and is a surface that faces the rear end side of the tool as well as the radially outward side of the tool. The first side wall surface 55 and the second side wall surface 56 are combined to define an area where the periphery of one not-operable cutting corner or cutting edge of the cutting insert 1 are fitted. Each of the first side wall surface 55 and the second side wall surface 56 is formed to be able to be favorably in abutment with the third flank portion 20.

A chip pocket 58 for disposing of chips is provided adjacent to the insert mounting seat 53. Here, the chip pocket 58 is formed so as to cut out the tool body 51 into a substantially half-moon shape toward the rear end side of the tool body 51. However, the shape or size of the chip pocket 58 is not limited to that illustrated in the drawings, and may be appropriately changed.

The cutting insert 1 is placed on the insert mounting seat 53 in a manner such that the lower surface 3 of the cutting insert 1 is brought into abutment with the bottom wall surface 54 of the insert mounting seat 53, and the peripheral side surface 4 of the cutting insert 1 is brought into abutment with the side wall surfaces 55 and 56 of the insert mounting seat 53. Thus, when the cutting insert 1 is placed on the insert mounting seat 53, the upper surface (rake face) 2 of the cutting insert 1 faces the front in the tool-rotational direction K. At this time, only the projections 31 provided on the lower surface 3 of the cutting insert 1 are brought into abutment with the bottom wall surface 54 of the insert mounting seat 53. Furthermore, as for the main side-surface portions 15 adjacent to the major cutting edges 11 in the peripheral side surface 4 of the cutting insert 1, only the third flank portions 20 are brought into abutment with the side wall surfaces 55 and 56 of the insert mounting seat 53. As described above, in a state where the cutting insert 1 is placed on the insert mounting seat 53, a screw is securely screwed into the screw hole 57 on the insert mounting seat 53 of the tool body 51 through the mounting hole 5 of the cutting insert 1. With this configuration, it is possible to fix the cutting insert 1 to the insert mounting seat.

The bottom wall surface 54 and the side wall surfaces 55 and 56 of the insert mounting seat 53 are designed such that the cutting insert 1 having the configuration described above is placed at a predetermined axial rake and a predetermined radial rake. The cutting insert 1 is mounted so as to have a positive axial rake with respect to the tool body 51. It is preferable to set the axial rake in a range of not less than 6° and not more than 14°, more preferably in a range of not less than 6° and not more than 9°. Furthermore, here, the cutting insert 1 is mounted so as to have a negative radial rake with respect to the tool body. It is preferable to set the radial rake in a range of not less than −8° and not more than 0°, more preferably, in a range of not less than −8° and not more than −2°. These ranges set for the axial rake and the radial rake are values generally set for rotary cutting tools as in this embodiment. Since the axial rake and the radial rake are set as described above, the slope angle (apparent relief angle) of the first flank portion 18 gradually varies along the major cutting edge 11 as described above in the case of the cutting insert 1 alone, while the true relief angle of the first flank portion 18 of the cutting insert 1, in other words, the angle formed by the first flank portion 18 and the tangential line (or a plane including this tangential line and being parallel to the rotational axis O) of the rotation locus of the tool along the major cutting edge 11 is constant in the case where the cutting insert 1 is mounted to the tool body 51. In the cutting tool 52 according to this embodiment, the true relief angle of the first flank portion 18 is 9°. The preferable range of this true relief angle is not less than 5° and not more than 13°. In order to mount the cutting insert 1 to the tool body 51 so as to have the axial rake and the radial rake described above, the insert mounting seat 53 is formed so as to be sloped at angles corresponding to the axial rake and the radial rake described above.

The cutting tool 52 having the cutting insert 1 mounted thereto rotates about the rotational axis O, and is used in cutting, in particular, in 90° shoulder milling. In FIG. 9 to FIG. 11, the reference sign "6a" is attached to the cutting edge used, namely, the operable cutting edge. The operable cutting edge 6a includes an operable major cutting edge 11a located on the outer peripheral side of the tool and generally extending in a direction of the rotational axis O of the tool, an operable minor-cutting edge 12a located on the leading end side of the tool and generally extending on a plane perpendicular to the rotational axis of the tool, and an operable first corner portion 9a located on the outer peripheral side of the tool and on the leading end side of the tool, namely, an operable corner-cutting edge 13a of the cutting corner. The operable major cutting edge 11a can be involved in cutting the side wall surface of a workpiece, and the operable minor-cutting edge 12a can be involved in cutting the bottom wall surface of the workpiece. Furthermore, the operable cutting edge 6a is configured to be suitable for 90° shoulder milling, and the cutting insert 1 is mounted to the insert mounting seat 53 as described above. Thus, the operable cutting edge 6a including the operable corner-cutting edge 13a can contribute to finishing, at 90°, a corner portion where the side wall surface and the bottom wall surface of the workpiece intersect.

In the indexable rotary cutting tool 52 according to this embodiment, for example, if the used cutting corner of the cutting insert 1 wears, it is possible to replace this cutting corner with another unused cutting corner. The cutting insert 1 has three cutting edges 6, namely, three cutting corners, and hence, it is possible to use it three times. According to the present invention, the shape of the cutting insert in a plan view is not limited to a substantially triangular shape, and other polygonal shape is possible. Thus, it is possible to use cutting corners for cutting in the number corresponding to the polygonal shape.

Next, descriptions will be given of operation and effect of the cutting insert 1 according to this embodiment and the indexable rotary cutting tool 52 having the cutting insert 1 mounted thereto.

The cutting insert 1 according to this embodiment has a configuration in which the main side-surface portion 15 adjacent to the major cutting edge 11 and capable of functioning as a flank is divided into the first flank portion 18, the second flank portion 19, the third flank portion 20, and the fourth flank portion 21. Furthermore, the slope angle of the first flank portion 18 in the case of the cutting insert 1 alone is smaller than the angle of the conventional technique. Thus, the true relief angle of the first flank portion 18 in the case where the cutting insert 1 according to this embodiment is mounted to the tool body 51 with an ordinary radial rake is smaller than that of the conventional technique. With this configuration, it is possible to favorably obtain a process damping effect. The process damping effect represents an effect of suppressing occurrence of vibration with an interference of a flank with a workpiece and suppressing chatter by reducing the relief angle to intentionally bring about a situation in which the flank is more likely to interfere with the workpiece. Large vibration occurring due to resonance in a system formed by a tool, a machine tool, and a workpiece can be suppressed by bringing the flank into contact with or closer to the workpiece to some degree. In the case of a conventional general cutting insert for 90° shoulder milling, it is considered that, in general, the true relief angle when the cutting insert is mounted to the tool body falls in a range of approximately 15° to 20°. Compared to this, the true relief angle of the first flank portion 18 of the cutting insert 1 according to this embodiment is approximately 9°, and the first flank portion 18 is in a state more likely to interfere with the workpiece. As described above, it is preferable that the true relief angle of the first flank portion 18 in the case where the cutting insert 1 is mounted to the tool body 51 falls in a range of not less than 5° and not more than 13°. If the true relief angle of the first flank portion 18 is less than 5°, the first flank portion 18 excessively contacts the workpiece to excessively increase a cutting resistance. Moreover, if the true relief angle of the first flank portion 18 is larger than 13°, the first flank portion 18 is in a state less likely to interfere with the workpiece, which leads to a reduction in the process damping effect. The true relief angle in the case where the cutting insert 1 is mounted to the tool body 51 can be reduced by changing the radial rake. However, in such a case, it is necessary to set the radial rake to more positive side fairly largely than usual, which may lead to losing entire balance of mounting angles of the cutting insert. Thus, in the present invention, the slope angle or the relief angle in the case of the cutting insert 1 alone is changed without changing the radial rake or without focusing on the radial rake. Incidentally, the smaller the cutting speed is, the larger the process damping effect becomes, and hence, the relief angle can be increased more as the cutting speed is smaller.

Furthermore, as described above, the width W of the first flank portion 18 is set to be constant, in other words, uniform in an area along the major cutting edge 11. The width of the first flank portion 18 is associated with the second flank portion 19. When the second flank portion 19 smoothly connects the first flank portion 18 and the third flank portion 20 without causing sharp unevenness, the second flank portion 19 secures the constant width of the first flank portion 18, and hence, it is possible to further improve the effect of suppressing chatter.

To obtain the process damping effect, it is configured such that the relief angle of the first flank portion 18 is set to be significantly smaller than the conventional technique, and the first flank portion 18 is more likely to be brought into contact with or close to the workpiece. Thus, due to mutual interference between the first flank portion 18 and the workpiece, a frictional force larger than the conventional technique is generated. In the case where the width of the first flank portion 18 varies along the major cutting edge 11, the size of a portion that interferes with the workpiece also varies along the major cutting edge 11, which may lead to unevenness in the balance of the frictional force. If the frictional force acting on the first flank portion 18 becomes uneven, the cutting resistance acting on the major cutting edge 11 also becomes uneven along the cutting edge, which may lead to deterioration in cutting performance. By making the width of the first flank portion 18 constant in an area along the major cutting edge 11, it is possible to make the frictional force acting on the major cutting edge 11 generally constant. As a result, the balance of the cutting resistance improves, whereby it is possible to prevent the cutting performance from deteriorating. This advantageous uniformity of the width of the first flank portion 18 is secured by the second flank portion 19.

Furthermore, the width of the first flank portion 18, which is set to be constant as described above, falls preferably in a range of not less than 0.1 mm and not more than 0.6 mm, and more preferably in a range of not less than 0.1 mm and not more than 0.5 mm. If the width of the first flank portion 18 is less than 0.1 mm, the area of the first flank portion interfering with the workpiece is excessively small, and hence, the process damping effect cannot be sufficiently obtained. On the other hand, if the width of the first flank portion 18 is larger than 0.5 mm, in particular, larger than 0.6 mm, the frictional force generated due to interference of the first flank portion 18 with the workpiece is excessively increased, which may cause a friction-type chatter. In addition, if the first flank portion 18 has such a great width, the cutting resistance is excessively increased, which may lead to deterioration in the cutting performance. Furthermore, it is more preferable that the width of the first flank portion 18 falls in a range of not less than 0.2 mm and not more than 0.4 mm. By setting the width in this range, it is possible to achieve the process damping effect in the most balanced manner. Moreover, the larger the process damping effect is, the smaller the cutting speed becomes, and hence, in the case where the cutting speed is small, it is preferable to set the width W of the first flank portion 18 to be short.

As described above, by setting the width of the first flank portion to be constant, the process damping effect can be achieved in a more favorable manner. Thus, although it is possible to form the first flank portion so as to vary the width thereof along the major cutting edge of the cutting edge as described above, it is preferable that the width of the first flank portion can be constant or substantially constant in an area along the cutting edge. The expression "the width of the first flank portion is substantially constant in an area along the cutting edge" includes that the width of the first flank portion slightly varies along the cutting edge. Preferably, a difference between the width of the first flank portion at one end portion of a cutting edge and the width of the first flank portion at the other end portion of the cutting edge is set in a predetermined range. This predetermined range can be set, for example, according to at least one of desired balance of cutting resistances and a desired degree of a process damping effect. Note that, in the case where the first flank portion is formed so as to vary the width thereof in an area along the cutting edge, it is preferable that an average value thereof is applied to a relationship with the diameter of an inscribed circle.

The second flank portion 19 contributes to setting the width of the first flank portion as described above, and smoothly connects the first flank portion 18 and the third flank portion 20 without causing sharp unevenness. This makes it easy for the cutting insert 1 to be removed from a die at the time of press molding. Furthermore, the second flank portion 19 is formed so as to have a slope angle δ greater than the slope angle γ of the first flank. Thus, it is possible to make the first flank portion 18 favorably interfere with the workpiece.

Furthermore, by setting the slope angle of the third flank portion 20 to be smaller than the conventional technique, in other words, to fall in a range of not less than 0° and not more than 11°, it is possible to prevent the cutting insert 1 from lifting during cutting work. In the conventional technique, an angle formed by a flank portion serving as a abutment surface to be brought into abutment with the side wall surface of the insert mounting seat and a lower surface of the cutting insert to be brought into abutment with the bottom wall surface of the insert mounting seat is a large obtuse angle. Thus, when the cutting insert is pressed against the side wall surface side of the insert mounting seat due to a cutting resistance acting during cutting work, the cutting insert tends to slide (lift) so as to climb up the side wall surface of the insert mounting seat. If the cutting insert lifts as described above, the cutting insert rattles, which leads to one of causes of chatter. Furthermore, this phenomenon leads to deterioration in accuracy of cutting. On the other hand, in the case where the slope angle of the third flank portion 20 serving as the abutment surface is set as in the cutting insert 1 according to this embodiment, it is possible to prevent the cutting insert 1 from climbing up the side wall surface 55, 56 of the insert mounting seat 53 if the cutting insert 1 receives the cutting resistance or force in a direction of the side wall surface 55, 56 of the insert mounting seat 53. Accordingly, the cutting insert 1 does not rattle, and thus it is possible to significantly prevent chatter from occurring. At the same time, with this operation, it is possible to obtain also an effect of improving accuracy of cutting. Furthermore, with the cutting insert 1 according to this embodiment, the relief angle of the first flank portion 18 is set to be small as described above to intentionally make the first flank portion 18 interfere with the workpiece to some degree, and hence, the cutting resistance acting during cutting is larger than the conventional technique. Thus, the tendency for the cutting insert 1 to lift is more significant. However, by setting the slope angle of the third flank portion 20 as described above, this problem can be solved. Furthermore, the third flank portion 20 is formed so as to have the largest area of the first flank portion 18 to the fourth flank portion 21, and hence, it is possible to secure the sufficient fixing properties of the cutting insert. Moreover, the reason for setting the slope angle of the third flank portion 20 in a range of not less than 0° and not more than 11° is that, if the slope angle is less than 0°, the lower portion (portion in the vicinity of the fourth flank portion) of the third flank portion 20 is highly likely to come into contact with the workpiece whereas, if the slope angle is greater than 11°, the lift preventing effect cannot be sufficiently obtained. However, the slope angle of the third flank portion 20 may be set to be a negative angle, provided that the above-described effects can be achieved.

Furthermore, by providing the fourth flank portion 21 having a greater slope angle than the third flank portion 20, it is possible to solve a problem of interference with the workpiece caused by reducing the slope angle of the third flank portion 20. More specifically, by setting the slope angle of the third flank portion 20 functioning as an abutment surface to be small as described above, it is possible to solve the problem of lifting of the cutting insert 1. However, with this configuration, a portion of the peripheral side surface 4 on the lower surface 3 side is more likely to interfere with the workpiece. In other words, a portion of the peripheral side surface 4 on the lower surface 3 side is more likely to protrude outwardly from the rotation locus of the operable cutting edge 6 of the cutting insert 1. However, this can be avoided by providing the fourth flank portion 21 having a large slope angle. As described above, with the present invention, the abutment surface, which is only one in the conventional technique, is divided into two, in other words, is divided into the third flank portion 20 and the fourth flank portion 21, whereby it is possible to achieve both prevention of lifting (suppressing chatter) and prevention of interference at the same time.

As described above, according to the present invention, the main side-surface portion 15 is divided into four, each of which has its own function, and these four flank portions 18, 19, 20, and 21 work in a cooperative manner, whereby it is possible to effectively suppress chatter without causing any accidental trouble. Thus, the present invention can prevent various troubles resulting from chatter such as a deterioration in accuracy of cutting and chipping. In other words, the present invention produces significant effects by combining the first flank portion 18 to the fourth flank portion 21.

Furthermore, by increasing the ratio of the thickness of the cutting insert 1 relative to the diameter of the inscribed circle IC in a plan view of the cutting insert 1, it is possible to improve the rigidity of the cutting insert 1 as a whole, and further enhance the effect of suppressing chatter. In particular, this configuration is effective in the case where the cutting insert 1 is small. In the case of a conventional cutting insert, if the size and the thickness thereof are reduced without changing a ratio, the thickness of the cutting insert is excessively small, and hence, the rigidity of the cutting insert as a whole deteriorates, which makes chatter more likely to occur. On the other hand, by appropriately setting the ratio of the thickness of the cutting insert 1 relative to the inscribed circle diameter IC of the cutting insert 1, it is possible to maintain rigidity of the cutting insert 1 as a whole even if the size thereof is small. Furthermore, by increasing the ratio of the thickness as described above, it is possible to obtain also effects of increasing the size of the third flank portion 20 serving as an abutment surface, improving a force that fixes the cutting insert 1, and furthermore, suppressing chatter. Furthermore, by increasing the ratio of the thickness as described above, the lower portion of the peripheral side surface 4 is more likely to interfere with the workpiece. However, with the fourth flank portion 21 being provided, this problem can be solved. As described above, the preferable range of the ratio of the inscribed circle diameter IC relative to the thickness of the cutting insert 1 is not less than 1.5 and not more than 2.2. If the ratio is less than 1.5, the cutting insert 1 is excessively thick, which significantly limits a space for mounting the cutting insert 1 to the tool body 51. Furthermore, if the ratio is greater than 2.2, the effect obtained by increasing the thickness of the cutting insert 1 is largely reduced.

Furthermore, as illustrated in FIG. 4, by providing the lower surface 3 with three projections 31, it is possible to improve seatability of the cutting insert 1. More specifically, by limiting the number of portions abutting with the bottom wall surface 54 of the insert mounting seat 53 to three, it is possible to stably mount the cutting insert 1 even if the lower surface 3 is not formed to be flat due to manufacturing tolerances. Thus, the cutting insert 1 does not rattle, so that chatter resulting from rattling can be suppressed. Furthermore, unlike the conventional technique, it is not necessary to grind the entire surface of the lower surface 3 of the cutting insert 1, and thus, it is possible to significantly reduce the manufacturing cost.

In this embodiment, the main side-surface portion 15 is configured to consist of four flank portions 18, 19, 20, and 21. However, the number of flank portions of the main side-surface portion 15 is not limited to this. More specifically, it may be possible to further add a surface portion or flank portion used for a specific application, provided that functions of the respective flank portions 18, 19, 20, and 21 described above are not impaired. Furthermore, in the cutting insert 1, the third flank portion 20 does not reach the lower surface 3. However, the third flank portion 20 may partially reach the lower surface.

The cutting insert 1 and the indexable rotary cutting tool 52 that have been described are used for 90° shoulder milling. However, the application of the present invention is not limited to this, and it may be possible to apply the present invention to various indexable rotary cutting tools as needed. It is preferable that, in the rotary cutting tool, at least four stages of flank portions as described above are formed on the flank located on the outer peripheral side.

These are descriptions of a typical embodiment according to the present invention. However, various modifications are possible to the present invention, and replacements and modifications are possible without departing from the spirit and the scope of the present invention defined in CLAIMS of this application.

The invention claimed is:

1. A cutting insert, comprising:
   a first end surface and a second end surface facing opposite to each other;
   a peripheral side surface extending between the first end surface and the second end surface; and
   a cutting edge formed at an intersecting ridge portion between the first end surface and the peripheral side surface, the cutting edge being formed so that the first end surface functions as a rake face and a part of the peripheral side surface functions as a flank, wherein
   a portion of the peripheral side surface adjacent to at least a part of the cutting edge includes at least a first flank portion adjacent to the cutting edge, a second flank portion, a third flank portion, and a fourth flank portion, which are arranged in this order from a side of the first end surface toward a side of the second end surface, wherein
   the first flank portion has a slope angle that gradually varies along the cutting edge, and a width that is constant or substantially constant in an area along the cutting edge from the side of the first end surface toward the side of the second end surface;
   the slope angle of the first flank portion has a minimum value that falls in a range of not less than 2.0° and not more than 6.0°, and the slope angle of the first flank portion has a maximum value that falls in a range of not less than 10.5° and not more than 14.5°;
   the second flank portion connects the first flank portion and the third flank portion, the second flank portion has a slope angle resulting in the second flank portion being angled toward a central axis (A) in a direction from the first flank portion toward the third flank portion;
   a slope angle of the third flank portion falls in a range of not less than 0.0° and not more than 11.0°; and
   the fourth flank portion has a slope angle greater than the third flank portion.

2. The cutting insert according to claim 1, wherein the width of the first flank portion falls in a range of not less than 0.1 mm and not more than 0.6 mm.

3. The cutting insert according to claim 1, wherein
   an inscribed circle (IC) is settable in the first end surface when the cutting insert is viewed from a side opposite to the first end surface; and
   a ratio of the diameter of the inscribed circle relative to the thickness of the cutting insert is not less than 1.5 and not more than 2.2.

4. The cutting insert according to claim 1, wherein
   the second end surface is formed so as to function as a seating surface when the cutting insert is mounted to a tool body; and
   the second end surface is provided with at least three projections.

5. The cutting insert according to claim 1, wherein
   the cutting edge includes a major cutting edge, an minor cutting edge, and a corner cutting edge connecting the major cutting edge and the minor cutting edge; and
   the first flank portion is adjacent to at least the major cutting edge.

6. The cutting insert according to claim 5, wherein
   the major cutting edge is formed so as to gradually approach the second end surface with an increasing distance from the corner cutting edge.

7. The cutting insert according to claim 5, wherein
   the first flank portion is formed so that the slope angle gradually increases with an increasing distance from the corner cutting edge along the major cutting edge.

8. The cutting insert (1) according to claim 1, wherein
   an outline shape of the cutting insert is substantially triangular when the cutting insert is viewed from a side opposite to the first end surface, and the cutting insert includes the three cutting edges.

9. An indexable rotary cutting tool comprising a tool body having at least one insert mounting seat at a leading end portion, with a cutting insert being detachably mounted on the insert mounting seat, wherein
   the cutting insert is a cutting insert according to claim 1;
   the cutting insert is mounted on the insert mounting seat with an axial rake falling in a range of not less than 6° and not more than 14° and a radial rake falling in a range of not less than −8° and not more than 0°; and
   a relief angle of the first flank portion of the cutting insert mounted on the insert mounting seat is not less than 5° and not more than 13°.

10. The indexable rotary cutting tool according to claim 9, wherein:
   the insert mounting seat has first and second side wall surfaces;
   neither the first nor second flank portions of the peripheral side surface are in abutment with the first and second sidewalls; and only the third flank portions of the peripheral side surface are in abutment with the sidewall surface of the insert mounting seat.

11. The cutting insert according to claim 1, wherein only the third flank portion comprises an abutment surface configured to abut a side wall of an insert mounting seat.

12. The cutting insert according to claim 1, wherein each of the slope angles of the first to fourth flank portions is defined on a first plane (P3) that is set in parallel to the central axis (A) and forms a right angle with respect to the cutting edge,
   wherein, each of the slope angles of the first to fourth flank portions is defined with respect to a second plane (P4), which passes through an intersecting portion between the cutting edge and the first plane, is perpendicular to the first plane, and is parallel to the central axis,
   wherein, the second plane only intersects the cutting insert at the cutting edge.

13. A cutting insert, comprising:
   a first end surface and a second end surface facing opposite to each other;
   a peripheral side surface extending between the first end surface and the second end surface; and
   a cutting edge formed at an intersecting ridge portion between the first end surface and the peripheral side surface, the cutting edge being formed so that the first end surface functions as a rake face and a part of the peripheral side surface functions as a flank, wherein
   a portion of the peripheral side surface adjacent to at least a part of the cutting edge includes at least a first flank portion adjacent to the cutting edge, a second flank portion, a third flank portion, and a fourth flank portion, which are arranged in this order from a side of the first end surface toward a side of the second end surface, wherein
   the first flank portion has a slope angle that gradually varies along the cutting edge, and a width that is constant or substantially constant in an area along the cutting edge from the side of the first end surface toward the side of the second end surface;
   the slope angle of the first flank portion has a minimum value that falls in a range of not less than 2.0° and not more than 6.0°, and the slope angle of the first flank portion has a maximum value that falls in a range of not less than 10.5° and not more than 14.5°;
   the second flank portion connects the first flank portion and the third flank portion;
   a slope angle of the third flank portion falls in a range of not less than 0.0° and not more than 11.0°; and
   the fourth flank portion has a slope angle greater than the third flank portion;
   wherein, each of the slope angles of the first to fourth flank portions is defined on a first plane (P3) that is set in parallel to a central axis (A) and forms a right angle with respect to the cutting edge,
   wherein, each of the slope angles of the first to fourth flank portions is defined with respect to a second plane (P4), which passes through the intersecting portion between the cutting edge and the first plane, is perpendicular to the first plane, and is parallel to the central axis A, and
   wherein, the second plane only intersects the cutting insert at the cutting edge.

14. The cutting insert according to claim 13, wherein the width of the first flank portion falls in a range of not less than 0.1 mm and not more than 0.6 mm.

15. The cutting insert according to claim 13, wherein an inscribed circle (IC) is settable in the first end surface when the cutting insert is viewed from a side opposite to the first end surface; and
   a ratio of the diameter of the inscribed circle relative to the thickness of the cutting insert is not less than 1.5 and not more than 2.2.

16. The cutting insert according to claim 13, wherein the second end surface is formed so as to function as a seating surface when the cutting insert is mounted to a tool body; and
   the second end surface is provided with at least three projections.

17. The cutting insert according to claim 13, wherein the cutting edge includes a major cutting edge, an minor cutting edge, and a corner cutting edge connecting the major cutting edge and the minor cutting edge; and
   the first flank portion is adjacent to at least the major cutting edge.

18. The cutting insert according to claim 17, wherein the major cutting edge is formed so as to gradually approach the second end surface with an increasing distance from the corner cutting edge.

19. The cutting insert according to claim 17, wherein the first flank portion is formed so that the slope angle gradually increases with an increasing distance from the corner cutting edge along the major cutting edge.

20. The cutting insert according to claim 13, wherein an outline shape of the cutting insert is substantially triangular when the cutting insert is viewed from a side opposite to the first end surface, and the cutting insert includes the three cutting edges.

* * * * *